US012682009B2

(12) United States Patent
Duvvuri et al.

(10) Patent No.: US 12,682,009 B2
(45) Date of Patent: Jul. 14, 2026

(54) CONTENT TARGETING USING CONTENT CONTEXT AND USER PROPENSITY

(71) Applicant: Oracle International Corporation, Redwood Shores, CA (US)

(72) Inventors: Venkata Chandrashekar Duvvuri, San Jose, CA (US); Srinivasa Golla, Bangalore (IN); Thanh Long Duong, Seabrook (AU)

(73) Assignee: Oracle International Corporation, Redwood Shores, CA (US)

( * ) Notice: Subject to any disclaimer, the term of this patent is extended or adjusted under 35 U.S.C. 154(b) by 706 days.

(21) Appl. No.: 17/139,790

(22) Filed: Dec. 31, 2020

(65) Prior Publication Data

US 2022/0207284 A1     Jun. 30, 2022

(51) Int. Cl.
| | |
|---|---|
| *G06N 3/08* | (2023.01) |
| *G06F 18/2113* | (2023.01) |
| *G06F 18/214* | (2023.01) |
| *G06N 3/045* | (2023.01) |
| *G06N 7/01* | (2023.01) |

(52) U.S. Cl.
CPC ........ *G06F 18/2113* (2023.01); *G06F 18/214* (2023.01); *G06N 3/045* (2023.01); *G06N 3/08* (2013.01); *G06N 7/01* (2023.01)

(58) Field of Classification Search
None
See application file for complete search history.

(56) References Cited

U.S. PATENT DOCUMENTS

| | | | |
|---|---|---|---|
| 11,392,968 B2 * | 7/2022 | Nielsen | G06F 16/9535 |
| 2014/0074604 A1 | 3/2014 | Castillo et al. | |
| 2016/0071162 A1 | 3/2016 | Ogawa et al. | |
| 2016/0125465 A1 * | 5/2016 | Kulkarni | G06F 3/0484 |
| | | | 705/14.57 |
| 2016/0225014 A1 | 8/2016 | Mitra et al. | |
| 2018/0040035 A1 | 2/2018 | Qi | |

(Continued)

FOREIGN PATENT DOCUMENTS

WO      WO-2020242383 A1 * 12/2020 ........... G06F 16/332

OTHER PUBLICATIONS

Li et al. "Adversarial learning for neural dialogue generation." arXiv preprint arXiv:1701.06547 (2017). (Year: 2017).*

(Continued)

*Primary Examiner* — Viker A Lamardo
*Assistant Examiner* — Leah M Feitl
(74) *Attorney, Agent, or Firm* — Invoke

(57)     ABSTRACT

Disclosed herein are techniques for machine-learning systems and methods for generating content objects using AI models. A method described herein includes predicting a propensity metric using a machine-learning propensity model describing a propensity of a user to interact with a tag. The method includes generating, using a content-tagging machine-learning model, a set of features characterizing the content object. The method includes determining, for each user in a set of users, a score that predicts a propensity of the user interacting with a particular content object. The method includes selecting a subset of users of the set of users based on the scores determined for the set of users. The method also includes facilitating output of the particular content object to each of the subset of users.

15 Claims, 8 Drawing Sheets

(56) References Cited

U.S. PATENT DOCUMENTS

| | | | | |
|---|---|---|---|---|
| 2018/0165590 | A1* | 6/2018 | Vlassis | G06N 5/045 |
| 2018/0285779 | A1* | 10/2018 | Zhou | G06F 16/285 |
| 2019/0057401 | A1* | 2/2019 | Subramanya | G06F 16/9535 |
| 2019/0080347 | A1 | 3/2019 | Smith | |
| 2019/0213660 | A1* | 7/2019 | Astrada | G06Q 40/02 |
| 2019/0236139 | A1* | 8/2019 | DeFelice | G06N 3/044 |
| 2019/0279096 | A1* | 9/2019 | de Nijs | G06F 16/951 |
| 2020/0265336 | A1* | 8/2020 | Merrill | G06N 5/045 |
| 2020/0372297 | A1* | 11/2020 | Terjek | G06N 3/047 |
| 2021/0241320 | A1* | 8/2021 | Chaudhari | G06N 20/00 |
| 2021/0406743 | A1* | 12/2021 | Liu | G06N 20/20 |
| 2022/0036890 | A1* | 2/2022 | Yuan | G10L 15/063 |
| 2022/0188347 | A1* | 6/2022 | Harishankar | G06N 20/00 |
| 2022/0284327 | A1* | 9/2022 | Zhang | G06N 5/04 |

OTHER PUBLICATIONS

Yang et al, "A Knowledge-Enhanced Deep Recommendation Framework Incorporating GAN-Based Models," 2018 IEEE International Conference on Data Mining (ICDM), Singapore, 2018, pp. 1368-1373, doi: 10.1109/ICDM.2018.00187. (Year: 2018).*

Quintanilla et al. "Adversarial Learning for Personalized Tag Recommendation." arXiv preprint arXiv:2004.00698 (May 2020). (Year: 2020).*

Cheng et al, "Sequential Attention GAN for Interactive Image Editing", MM '20: Proceedings of the 28th ACM International Conference on Multimedia, pp. 4383-4391, Oct. 2020, https://doi.org/10.1145/3394171.3413551 (Year: 2020).*

Bai et al, "Model-Based Reinforcement Learning with Adversarial Training for Online Recommendation." arXiv preprint arXiv:1911.03845 (2019). (Year: 2019).*

Wang et al, "Quality-Sensitive Training! Social Advertisement Generation by Leveraging User Click Behavior". In the World Wide Web Conference (WWW '19). Association for Computing Machinery, New York, NY, USA, 2045-2055. 2019 https://doi.org/10.1145/3308558.3313536 (Year: 2019).*

Xu et al. "Adversarial Counterfactual Learning and Evaluation for Recommender System." arXiv preprint arXiv:2012.02295 (Nov. 2020). (Year: 2020).*

"Add Audience Targeting to an Ad Group or Campaign", Available Online at: https://support.google.com/google-ads/answer/2497940, Accessed from internet on Nov. 24, 2020, 2 pages.

"Inteltarget: Predictive Behavioral Targeting", Available Online at: https://www.inteltarget.com/, Accessed from internet on Nov. 24, 2020, 19 pages.

Daltayanni et al., "Automated Audience Segmentation Using Reputation Signals", Available Online at: https://dl.acm.org/doi/abs/10.1145/3219819.3219923, Aug. 19-23, 2018, pp. 186-195.

Prajapat , "Propensity Modelling at Scale Using TensorFlow Estimators and Cloud AI Platform", Available Online at: https://datatonic.com/insights/propensity-modelling-tensorflow-cloud-ai/, Accessed from internet on Nov. 24, 2020, 20 pages.

* cited by examiner

400

| OBTAIN SEED CONTENT AND SUBSET OF USERS | —405 |

↓

| EVALUATE INTEGRATION FUNCTION | —410 |

↓

No ← IMPROVEMENT AVAILABLE? —415

Yes

↓

| SELECT SECOND SUBSET OF USERS | —425 |

↓

| GENERATE NEW CONTENT OBJECT | —430 |

↓

| EVALUATE INTEGRATION FUNCTION | —435 |

↓

IMPROVEMENT AVAILABLE? —440 — Yes

No

↓

| OUTPUT NEW CONTENT OBJECT | —445 |

| OUTPUT CONTENT OBJECT | —420 |

CONTENT TARGETING USING CONTENT CONTEXT AND USER PROPENSITY

TECHNICAL FIELD

The present disclosure relates to systems and methods for using machine-learning models to dynamically select content by non-binary classification of images and text.

BACKGROUND

A content object may include an image and/or text instructions to a user of a computing device to implement a virtual interaction process, such as accessing an application by interacting with the content object. For example, a contact tracing message may be provided to notify a user of potential exposure to a contagious disease and may request the user to respond through an associated application. To address the visibility and urgency of the message, the content object may present emphasized content, such as bolded text, an image of a doctor, or bright colors. As other examples, the content may be emphasized via text selection (e.g., "warning" or "attention").

However, some types of emphasis may be more likely to attract the attention of some users as compared to others. For example, a content object including large, emphasized images may be better suited to warn a first user group (who may be likely to respond to larger font or emphasized images) as compared to a second user group (who may be more likely respond to descriptive text). In this way, providing the same content to all users may be ineffective at achieving the purpose of the notification and targeted content may improve the efficacy of the content object.

BRIEF SUMMARY

In some embodiments, systems and methods are provided to classify content objects using features, such as qualitative features, and selecting a subset of users predicted to exhibit at least a given propensity to interact with the content object according to a performance metric. A content system may define one or multiple machine-learning models, such as an image analysis model, a text analysis model, a propensity model, and/or a generator model as part of an integration subsystem. The present disclosure relates to techniques, methods, and systems for using models defined by the content system to classify content objects, select subsets of users corresponding to features of content objects, generate content objects using generator models to improve the efficacy of the content objects at satisfying a performance metric, and facilitate the output of the content objects to the subset of users.

In some embodiments, the classification of the content objects may be undertaken by content analysis models, such as the image analysis model, which may predict one or more qualitative features of a content model. The propensity model, in turn, may be trained to generate a score for each user of a set of users that predicts a propensity of interacting with a qualitative feature, based at least in part on characteristics of the user. In this way, the propensity model may generate a mapping of features to user characteristics. The generator neural network model may be configured to take in the content object and information describing a subset of the set of users, and to generate a new content object to better map to the subset of users. In some embodiments, the generator neural network model may be configured to generate a content object based tags with which a seed subset of users exhibit a high propensity to interact. In accordance with a performance metric, which may describe target characteristics of a subset of users, a number of users, or a predicted level of interaction with the content object. Furthermore, the generator neural network model may be implemented as part of an integration subsystem, which may iterate the generator neural network model to generate new content objects in multiple iterations, as an approach to satisfying the performance metric.

In some embodiments, a training system is configured to train the propensity model and/or the generator neural network model by various techniques including, but not limited to, supervised or unsupervised learning. For instance, a Generative Adeversarial Network (GAN) may include a generator neural network model, a discriminator neural network model and an error-minimization module. In some embodiments, the generator neural network model and the discriminator neural network model are machine-learning models that are trained as adversaries, causing both models to improve jointly.

In some embodiments, the propensity model is trained using seed data collected from previous interactions between users and content objects. The propensity model may be or include a multinomial logistic regression model trained to map features of a content object to characteristics of users from which a set of users may be selected to receive the content object. Furthermore, the propensity model may be trained in accordance with a target level of interaction by the user, such that a number of propensity models may be paired with the generator neural network model to generate content objects for different target levels of interaction, as well as different subsets of users.

The foregoing, together with other features and embodiments will become more apparent upon referring to the following specification, claims, and accompanying drawings.

DETAILED DESCRIPTION

Figure 1:
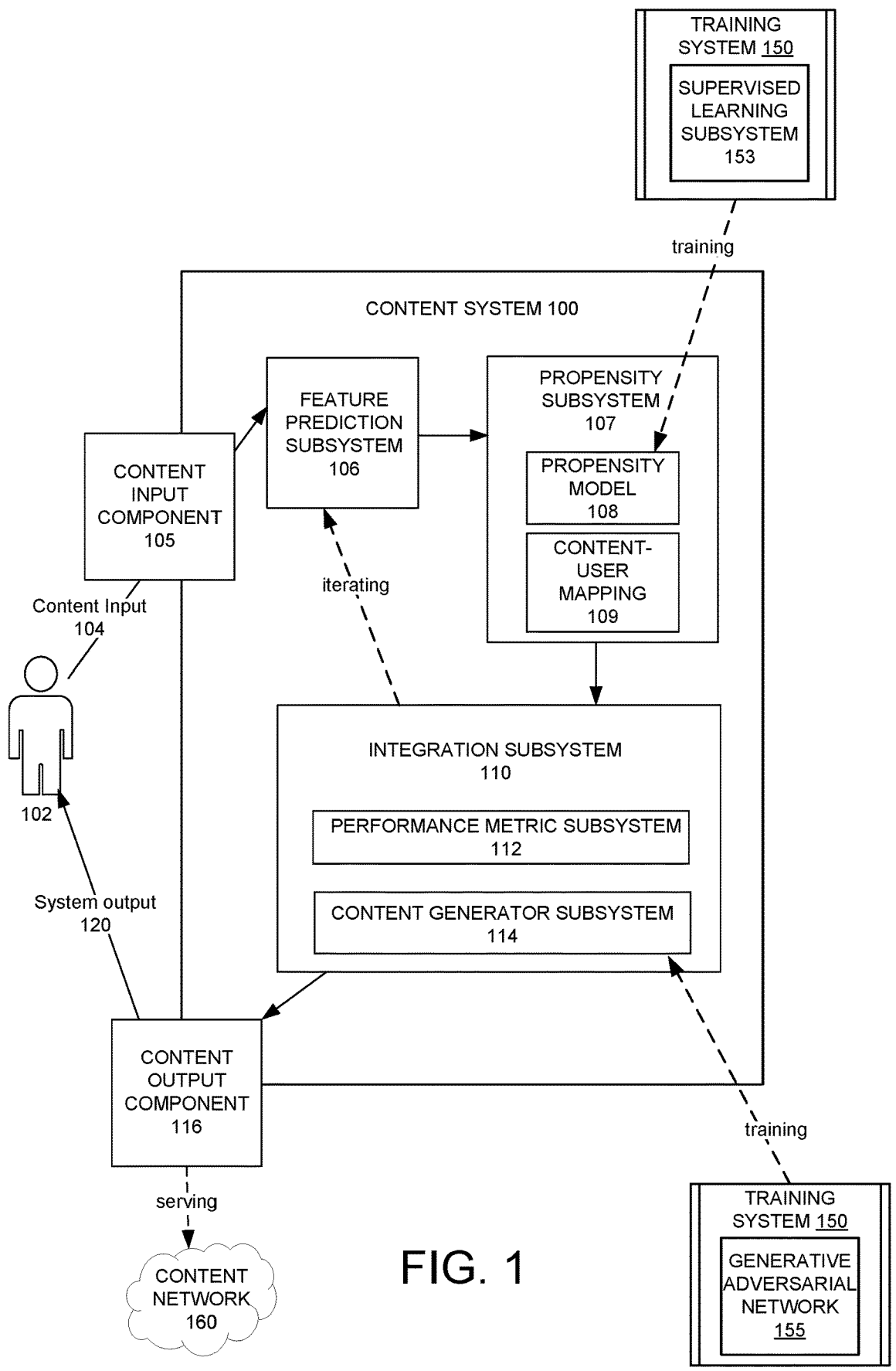
FIG. 1 is a diagram of a content system incorporating a feature prediction subsystem, a propensity subsystem, and a generator neural network model trained in a generative adversarial network, according to certain embodiments described herein.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" or as an "example" is not necessarily to be construed as preferred or advantageous over other embodiments or designs.

In some embodiments, techniques, systems, and methods are provided for accessing, modifying, and generating image data and/or text data. For example, such a system may be provided as a stand-alone device or as a cloud-accessible service. In each of these forms, the system is capable of accessing and/or receiving images and text and sets of user metadata. The images and text may be described by qualitative features that, in combination, can be mapped to the user metadata through a propensity metric predicted by a propensity neural network model. To that end, the system may classify features of the images and text using a content-tagging machine-learning model trained to detect tags in the images and/or the text, and to generate sets of features detected in the images and/or the text.

Qualitative features may describe elements of the content object, such as objects, emotions, colors, or other aspects. For example, a content object including an image of a group of young, smiling faces, paired with the text "you can vote!" may be described by qualitative features such as, "enthusiasm," "young people," "voting," "smiling," or the like. In the context of a machine-learning system, the features may be included in a dataset of tags that a classifier is trained to detect. The features of the content object may influence the propensity of a user of a device that presents the content object to engage with the image and the text presented. For example, an older viewer, who has voted in many elections, may be unlikely to interact with messages or links contained in the content object. By contrast, a user who is a first-time voter or is politically active may be more likely than the older viewer to engage with the content object. Because some features are better suited to engage certain users, engagement may be improved by providing content objects to users who are likely to respond.

Conventionally, content objects are created by human designers or by rules-based models. Each content object may be provided to a set of users, which may be defined using a set of user attributes. The set of user attributes may be selected based on one or more individuals' expectations as to the type of person who may be receptive to various content qualities. In some instances, the set of users may be defined irrespective of a potential receptiveness of various types of content. For example a notification to authorize administrator access to install software, a notice with a clickable link to view privacy terms, or a warning that a website has an expired safety credential may be formulated to be presented to all user devices connected through a given network without regard to characteristics of the viewer. In another example, a push notification that an office will be observing a holiday with reduced operating hours may be selected to be presented at all user devices associated with a particular office. It may be understood that these approaches may fail to take into account higher-order interactions that could improve the efficacy of the notifications and are less likely to successfully inform the user or achieve a response from the user receiving the content object.

In another illustrative example, the effectiveness of a contact tracing application developed to track exposure to a contagious virus may rely on active participation of users of the application, for example, by responding in a timely manner to notifications. A user of a mobile device may receive a push notification including a content object presenting image(s) or text to alert the user of potential exposure to a contagious virus. The contact tracing application may request, as part of the content object, that the user consent to upload GPS data to a server, to manually affirm that they are not feeling symptoms of the virus, or to provide a confirmation of the location where the contact may have occurred. In this way, interaction with the content object at one or more levels of interaction, such as (i) viewing the image and/or text information, (ii) interacting with the content object, or (iii) completing an action through the content object (also referred to as "converting"), such as uploading GPS data or launching a contact tracing web page in a browser and providing information. In such a system, the efficacy of the content object to facilitate contact tracing may depend on the propensity of the user to respond to the content presented. Similarly with the examples above, serving the same content object to every device may reduce the efficacy of the content object, which could be improved by differentiating content for different users or by selecting a subset users based on a predicted propensity metric indicating an extent to which the users have a propensity to engage with features of the content object.

In contrast to the conventional approaches, techniques, methods. and systems presented herein define machine-learning models to generate a content object (e.g., using an adversarial network) and to identify a particular set of users (or particular user attributes that define the particular user set) including users predicted to interact with the content object (e.g., in a particular manner). As opposed to the conventional approaches, machine-learning methods and systems may improve the pairing of content objects to a subset of users and may permit content objects or subsets of users to be selected to satisfy performance metrics. For example, machine-learning propensity models may be trained for a particular level of interaction. As another example, generator neural network models, trained as part of a generative adversarial network (GAN), may be configured to add and/or remove visual elements of a content object and/or users of a subset of users.

In some embodiments, the content system may receive a seed content object or a seed subset of users, either of which can be determined using stored images or user sets or based on the content system receiving a content object or target set of users. The seed content object or the seed subset of users may be processed to predict a set of qualitative features or a set of characteristics, respectively. In the case of a seed content object, a subset of users may be selected to receive the content object based on a mapping of content features to user characteristics predicted by the propensity model. For example, the propensity model may implement a non-binary classifier that takes in a set of features detected in a set of content objects and outputs a vector of probability values identifying, for each user of a set of users, a set of content features to which the user exhibits a high propensity for interaction. For example, a user of the set of users may be associated with a number of characteristics in user metadata that are associated with a high propensity for a particular feature or group of features. The propensity model may, therefore, predict propensity metrics for each user describing the probability that a user will interact with a particular feature of a content object. The propensity model may determine a score for the user, based on the propensity metrics. The set of users may be ranked by score, and filtered to select a subset of users to receive the content object. In this way, propensity models can be trained to predict mappings between user characteristics (e.g., age bracket, location, characteristics of searching history, etc.) and object features to facilitate targeted presentation of content objects to sets of users.

In some embodiments, the content system modifies the content input, such as the seed content, or adds and/or removes users from the seed user sets, to generate a content object with improved efficacy. As part of modifying the content object, the content system may incorporate an integration subsystem using a generator neural network model and an integration model, where the generator neural network model is trained to reference the propensity model and to generate new content objects in accordance with the mapping generated by the propensity model.

Generating a new content object may include, but is not limited to, adding or removing visual elements and/or text that correspond to features predicted to improve the content object with respect to a performance metric (e.g., by taking in a seed content object and outputting a new content object, or by generating an entirely new content object based on a seed subset of users). In some embodiments, the performance metric describes criteria, such as maximizing the number of users that click on an image. The criteria might also specify the amount of computing resources, time, or other expense that can be spent to solve the problem. Together, the performance metrics may be used to govern the operation of the generator neural network models through an integration subsystem. The integration subsystem may evaluate whether the content object and/or information describing the set of users may be improved with respect to the performance metrics, and may iterate the generator to modify the content object in a way that improves the outcome of a subsequent evaluation. Similarly, the integration subsystem may add and/or remove users from the set of users to improve subsequent evaluations of the content object and the set of users with respect to the performance metric.

When the integration subsystem has prepared the content object and/or the subset of users, the content system may facilitate the output of the content object each of the subset of users, for example, by serving the content object to a distribution network configured to serve the content object to devices associated with the set of users, such that the users receive the content object. Additionally or alternatively, the content system may present the content object, information describing the set of users, or both, via an output component (e.g., a display device or other electronic device). For example, a user of the content system may view the progress and/or the output of the content system using a personal computer.

While the examples described here focus on public health and public service notifications provided to facilitate user interactions, similar approaches may be applied to increase efficacy of other forms of content objects. For example, content objects may include push notifications, subscription service content, social media content, information about objects, severe weather notifications, disaster notices, election information, or other combinations of images and text that are intended to reach a target set of users of a device and elicit a response through an associated application.

A machine-learning propensity model may be an example of a multinomial logistic regression model and/or a neural network model. Multinomial logistic regression is a classification method that generalizes logistic regression to multiclass problems with more than two possible discrete outcomes, as opposed to binary classifiers. Generally, multinomial logistic regression models predict the probabilities of the different possible outcomes of a categorically distributed dependent variable, given a set of independent variables. In this way, the output of the model typically includes a vector of probability values, where a higher value indicates an increased likelihood that the input can be classified in a corresponding group. For example, a bounded probability vector with values summing to one may be produced by a logit function applied to the output layer of a neural network. In the context of predicting propensity metrics and scoring users, the propensity model may associate a probability value (e.g., a positive number less than one) with a content tag for a specific user, based on the combination of user characteristics described in user metadata.

A generative adversarial network (GAN) is an architecture that trains a generator and a discriminator in an adversarial manner. GANs are typically used in image analysis and, particularly, in the field of machine vision. In an example conventional GAN, an image generator generates images intended to be in a specific class (e.g., images of faces), and the discriminator determines whether the generated images are indeed in that class. By comparing the outputs of the image generator and the discriminator to accurate distributions of outputs, the GAN provides a training signal to the image generator and to the discriminator to train the image generator and the discriminator. GANs are particularly useful when the training data available is smaller than would be ideal for individual training, because the adversarial nature can lead to effective training with a relatively small set of training data.

In some embodiments of a content system described herein, a generator neural network model of the content system is trained in a GAN. Specifically, the generator neural network model may learn to generate or modify content including images or text, and a discriminator neural network model may learn to distinguish between authentic and inauthentic content. Authenticity, in this context, refers to the role of the discriminator neural network model to train the generator neural network model to generate representational content, as opposed to physically impossible or meaningless content that may nonetheless satisfy internal criteria. To that end, an error-minimization module may apply one or more objective functions to provide a training signal to train the generator neural network model and the discriminator. After training, the generator neural network model may be used to input and modify seed content objects or to generate content objects as part of the content system.

FIG. 1 is a diagram of an example of a content system 100, according to certain embodiments described herein, which utilizes a feature prediction subsystem 106, a propensity subsystem 107, and a generator neural network model trained in a GAN 155. The content system 100 is configured to receive content inputs 104, also referred to as content objects, from a user 102, such as through a user interface. For example, the content input module 105 receives content objects through an upload utility of a browser or console environment. The content system 100 may then interpret the content inputs 104. The content system 100 may perform or cause one or more actions to be performed using the content inputs 104, for instance, by using the feature prediction subsystem 106, the propensity subsystem 107, or the integration system 110, which utilizes the content generator subsystem 114. Additionally or alternatively, the content system 100 may be configured to receive seed sets of users, provided to the content generator subsystem 114 as part of an integration subsystem 110, and may perform or cause additional or alternative actions to be performed using the seed sets of users. In this way, the content system 100 may process content objects using the integration subsystem 110, and may output sets of users and modified content objects, also referred to as system output 120, such as by way of a content output component 116. For example, the content output component 116 can be a display or another device that can output data to the user 102. In some embodiments, the content system 100 is further configured to serve output data to a content network 160, for example, by providing content objects to the set of users, storing modified content objects in distributed storage, or by providing system output to associated systems for subsequent processing. The content system 100 is a specialized computing system that may be used for processing large amounts of data potentially using a large number of computer processing cycles. The numbers of devices depicted in FIG. 1 are provided for illustrative purposes. Different numbers of devices may be used. For example, while each device, server, and system in FIG. 1 is shown as a single device, multiple devices may be used instead.

In certain embodiments, the processing performed by the content system 100 is implemented by a pipeline of components or subsystems. The subsystems listed above may be implemented only in software (e.g., using code, a program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The content input component 105 includes hardware and software configured to receive content input 104. In some instances, the content input component 105 may be part of the content system 100. In some other instances, the content input component 105 may be separate from and be communicatively coupled with the content system 100. The content input component 105 may, for example, include data input hardware and software executed on a personal computing device. In another illustrative example, the content input component 105 may include an application programming interface (API) in communication with the feature prediction subsystem 106 or other subsystems of the content system 100, configured to interface with computer systems over a network.

The feature prediction subsystem 106 is configured to access and/or receive a content object and to output a set of tags predicted to be included in the content object, for example, as part of a content-tagging machine-learning model. Tags may refer to features or other qualitative aspects of a content object that may be used to map content objects to user characteristics. To that end, the feature prediction subsystem 106 may utilize one or more machine-learning models, such as image and/or text classifier neural networks, predict the set of tags for a particular content object, received and/or accessed as part of facilitating output of the particular content object to a subset of users. In an illustrative example, a content object includes an image and text.

The feature prediction subsystem 106 may receive the content object from the content input component 105 or may access the content object from a data store in communication with the feature prediction subsystem 106. The feature prediction subsystem 106 may then input the content object into an image analysis model and a text analysis model, which may generate a set of features describing the content object included in the image and the text, respectively. In some embodiments, the image analysis model and the text analysis model are classifiers trained to predict the set of features from a larger set of known tags (e.g., a vocabulary), which may include millions of known tags, or more, describing visual and textual aspects included in the content object.

Upon predicting the set of features, the propensity subsystem 107 is configured to access or receive the set of features, for example, from a data storage utility in communication with the content system 100, and to output a subset of users. The subset of users may be a subset of a larger set of users, for which user metadata may be provided by the user 102 as part of the content input 104. Additionally or alternatively, the user metadata may be maintained and/or stored in a data store in communication with the content system 100, such as distributed storage, such that the propensity subsystem 107 may be configured to access the user metadata in response to the feature prediction subsystem 106 outputting the set of features.

As part of its processing, the propensity subsystem 107 uses the propensity model 108 to generate a content-user mapping 109. The content-user mapping 109 describes a correspondence between features of the content object and users in accordance with a score predicted for each user. In an illustrative embodiment, the content object includes a public service announcement, such as polling place locations and election information. For example, a feature of the content, such as "young faces," which may be a qualitative feature rather than a keyword, may be correlated with a high probability that a user characterized as "new voter" will interact with a feature of the content object. Where the purpose of the content object is to draw a user's attention and to cause the user to interact with the object, the propensity of a user to view, click on, or otherwise interact with the content object may be predicted by the propensity model 108.

In this way, the propensity subsystem 107 may implement a machine-learning propensity model 108, trained to predict a performance metric for each user of the set of users for "young faces," indicating an extent to which the user has propensity for interacting with content objects associated with the content tag. Propensity metrics may correspond to levels of content interaction, such as propensity to view, to interact with active elements in the object, to prioritize the content object over other active application content, or to interact with associated systems through the object. For example, a propensity metric may be correlated a qualitative descriptor of a level of interaction and/or a coded value describing the level of interaction. To predict the propensity metric for each user, the propensity model 108 may be trained to take in user characteristics and to output a probability value for each user and for a particular content tag. In this way, a user of the set of users may be described by a number of propensity metrics. In some embodiments, the propensity subsystem 107 may limit the number of propensity metrics that are predicted by selecting relevant characteristics to a particular content object. Selection of relevant characteristics may include, but is not limited to, implementing a selection algorithm (e.g., a regressor algorithm) over stored interaction data describing users of the set of users.

To generate the mapping 109, the propensity model 108 may score each user of the set of users, by determining the features to which each user has a propensity for interacting. A score may describe a logistic probability (e.g., a positive number less than one) that a user will interact with a given feature, as predicted by the propensity model 108. In this way, each user of the set of users may be scored for each of the features of the set of features. In this way, the mapping 109 may describe a ranking of users from the set of users, by score, for one or more features of a content object. Using the mapping 109, a subset of users may be selected (e.g., by selecting the top "N" highest scoring users) based on scores determined for the set of features.

As such, different content objects may be formulated for different target sets of users. In the illustrative example of a public service announcement, different sets of users may be shown different content, including different active elements and different image and textual information, as an approach to improving various aspects of efficacy of the content object. For example, a set of new voters may be presented with a content object that includes "enthusiastic" images and text emphasizing that the content object is directed to a "new voter." This may be achieved, for example, by including images of the number one, text such as "first time," or images of young people voting. In this way, a content object may be modified to improve the propensity of a target set of users to interact with the content. In another example, the set of users selected using the content-user mapping 109 may be modified to satisfy a performance metric, such as size of the set of users, qualitative characteristics of the users, or quantitative predictions of the efficacy of content objects.

The propensity model 108 may be trained using historical interaction data. For example, a dataset may be accessed by the content system 100, either provided as part of content input 104 or via a database in communication with the content system 100, where the dataset includes historical interaction data for content objects and metadata describing content object tags. The interaction data may include characteristics of the users that registered interactions at one or more particular levels. For example, the propensity model may be trained to take in a content tag and user characteristics, and output a propensity metric (e.g., a probability value) describing the propensity of the user described by the user characteristics to interact with content objects including the content tag. By predicting a propensity metric for each feature identified in a content object, the propensity model 108 may score each user in the set of users. In this way, rather than presenting the same content object to every user, content objects may be targeted to specific subsets of users, or may be modified in a way that is likely to improve the propensity of a subset of users to interact with the content object. Training the propensity subsystem is described in detail in reference to FIG. 2.

In some embodiments, the selection of a new subset of users and/or generating a new content object is implemented by the integration subsystem 110. The integration subsystem 110 accesses or receives content objects, sets of users, or performance metrics provided by the user as content input 104. The content objects received by the integration subsystem 110 may include image data and/or text data characterized by the set of features predicted by the feature prediction subsystem 106. The integration subsystem 110 may also receive or access the features predicted by the propensity model 108 to map to user characteristics of a particular population. The particular population may be or include a target subset of users, for example, the subset of users selected by the propensity subsystem 107. In an illustrative example, the integration system 110 receives a subset of users, a content object, a set of features predicted to describe the content object, and one or more performance metrics. In the example of election information announcements, the performance metric may include a fraction of users that have been registered to vote in the current year.

To that end, the integration subsystem 110 may include a performance metric subsystem 112 and a content generator subsystem 114. The performance metric subsystem 112 accesses the data received by the integration subsystem 110, such as the subset of users, the set of features, and the performance metric, and evaluates an integration model to determine one or more optimization variables. Optimization variables may include, but are not limited to, measures of offset between a composition of the subset of users and a performance metric describing a target composition, or whether the predicted efficacy of the content object may be improved by adding or removing features, or both. The performance metric subsystem 112 may also implement computational resource management techniques, whereby a decision may be implemented based on limits on computational resources imposed on the content system. For example, the content system 100 may iterate the integration subsystem 110 as an approach to satisfying the performance metric, for example, by iterating the content generator subsystem 114 to generate a new content object and re-evaluating the new content object against the performance metric. In some embodiments, the integration subsystem 110 may be configured to iterate until a termination criterion is satisfied, which may include, but is not limited to, a maximum number of iterations, a resource allocation, or a gradient in an optimization variable approaching a minimum value (e.g., zero). As described in reference to FIGS. 4-5, with each iteration the new content objects may include new image data and/or text data describing newly added features while not describing omitted features excluded by the integration subsystem 110. In an illustrative example, an optimization cycle of multiple iterations by the integration subsystem 110 may include reselecting the subset of users and generating new content objects for each iteration. In a first iteration, the size of the subset may be increased, which may result in a new set of content tags for which the subset of users exhibits the highest propensity for interaction. Generating a new content object including image data and/or text data corresponding to the new set of content tags. Selecting a new subset of users, for example, based on a second performance metric, may be paired with generating a new content object as a second iteration of the generator neural network. In this way, the integration subsystem 110 may continue improving the content object until one or more termination criterion are satisfied (e.g., reaching a maximum number of cycles, exhausting a resource allocation, or approaching a stationary point of an optimization variable).

In some embodiments, the integration subsystem 110 predicts whether final results are expected based on estimating a gradient in an optimization variable over several prior iterations of the content system 100, estimating the computational resources used to iterate the integration subsystem 110, and/or estimating time remaining until a deadline for generating a modified content object. For example, if predicted performance is improving with respect to the performance metric with each iteration (e.g., the marginal improvement is significant), the content system 100 may iterate the integration subsystem 110. Where the content object satisfies the performance metric, or the characteristics of the subset of users satisfy the performance metric, the integration subsystem 110 may output the content object and identification information describing the subset of users. In some cases, the content system 100 prioritizes satisfying the performance metric without regard to the computational resources or other resources remaining in the allocation, such that the integration system 110 outputs the new content object and/or new subset of users, despite not having reached a computational resource allocation limit.

As shown in FIG. 1, in some embodiments, a training system 150 trains the propensity model 108. For example, the propensity model 108 may be or include a multinomial logistic regression neural network model. As such, the training system 150 may implement supervised training of the propensity model 108, as described in more detail in reference to FIG. 2. To that end, the training system 150 may access and/or receive one or more sets of training data, which may serve as a ground truth for training the propensity model 108 to predict the content-user mapping 109 for a given propensity metric.

In some embodiments, the training system 150 trains the content generator subsystem 114, as a generator neural network of a generative adversarial network (GAN) 155 to prepare the content generator subsystem 114 for its operation in the content system 100. For instance, the training system 150 utilizes the GAN 155 to train the content generator subsystem 114 to perform the tasks described above for generating a content object associated with characteristics of a subset of users, as part of satisfying a performance metric. In some embodiments, the content system 100 is improved over a conventional system by the use of this adversarial technique of training the content generator subsystem 114. In particular, implementing adversarial learning, as described in reference to FIG. 3, may improve the performance of the content generator subsystem 114 by training the generator to output authentic content, representational of real information, rather than unrealistic or meaningless content.

As described above, the various subsystems of the content system 100 working in cooperation provide the functionality that enables the content system 100 to receive content inputs 104 and to output system output 120, such as content objects and information describing subsets of users. The various subsystems described above may be implemented using a single computer system or using multiple computer systems working cooperatively. For example, for a device implementing the content system, the subsystems of the content system 100 described above may be implemented entirely on the device with which the user interacts. In some other implementations, some components or subsystems of the content system 100 may be implemented on the device with which the user interacts, while other components may be implemented remotely from the device, possibly on some other computing devices, platforms, or servers.

Figure 2:
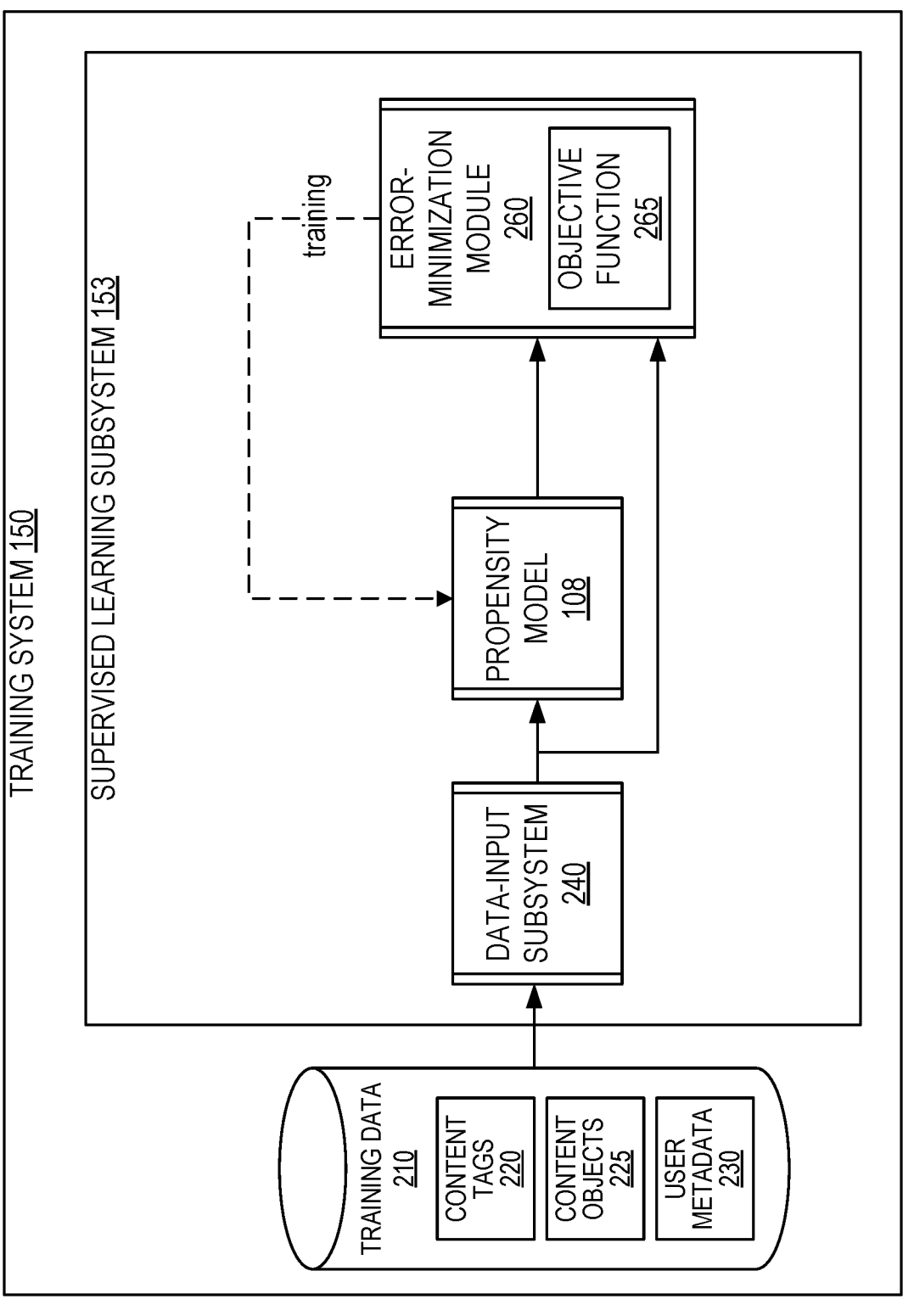
FIG. 2 is a diagram of a training system configured to train the generator neural network model of the content system through the use of a generative adversarial network, according to certain embodiments described herein.

FIG. 2 is a diagram of a supervised learning subsystem 153 of the training system 150 for training the propensity model 108, according to certain embodiments described herein. As described above, the propensity model 108 may be or include a non-binary classifier, such as a multinomial logistic regression model implemented in a neural network, trained to predict a probability that an input can be mapped to one or more classes of a set of classes, corresponding to content tags 220 or user characteristics from user metadata 230. As such, training the propensity model 108 may include applying a supervised learning technique using one or more labeled sets of training data 210, which may include content tags 220, content objects 225, and user metadata 230, which may include user characteristics or other identifiers, such as anonymized identification numbers. Content tags 220, may be drawn from a database of features that the feature prediction models are trained to identify. As such, the content tags 220 may correspond to the features that may characterize content objects processed by the content system 100.

In some embodiments, the training data 210 includes a first set of training elements and a second set of training elements. The training elements may be described as seed tuples, as described in more detail in reference to FIG. 2. Each training element of the first set of training elements may include a content object 225, one or more content tags 220, and user metadata 230. In some instances, each of the first set of training elements includes a content object 225 with text, and the one or more tags 220 characterize the text. In some instances, each of the first set of training elements includes a content object 225 with an image, and the one or more tags 220 characterize the image. In some instances, each of the first set of training elements includes a content object 225 with text and an image, and the one or more tags 220 characterize the image in the content object 225. In some instances, one set of training elements includes tags 220 that characterize text in content objects 225, and another set of training elements includes tags 220 that characterize images in multiple content objects 225.

Each training element in a second set of training elements may include one or more tags 220 that characterize a content object 225. Each training element further includes user metadata 230 that indicates one or more characteristics of a user to which the content object 225 was presented. Each training element further indicates whether and/or how the user interacted with the content object 225. Using the user metadata 230 as inputs, the propensity model 108 is trained to predict content tags 220 that are associated with user characteristics.

As part of supervised training, the supervised learning subsystem 153 may use the training data to define a ground truth, such that elements defining a mapping of tags 220 and user characteristics from the user metadata 230 are provided to an error minimization module 260 by a data-input subsystem. The error minimization module 260 may, in turn, implement an objective function 265, which may be an error function, for example, defined as a distance between the model output and the ground truth. In this way, training may include adjusting one or more weights and/or coefficients of the propensity model 108 over multiple iterations until the value of the objective function converges to a global minimum.

In some embodiments, the input to propensity model 108 includes the characteristics of a set of users, and the output includes a vector of probability values corresponding to predicted content features. In this way, the propensity model 108 may be trained to map the content tags 220 of the training data 210 to the user metadata 230 of the training data 210, and, once trained, the propensity model 108 may be used to generate the content-user mapping 109. As trained, the propensity model may be able to predict a propensity metric indicative of the extent to which the user has propensity for interacting with content objects associated with a particular content tag 220. In this way, the propensity model 108 may determine one or more tags 220 with which the user is likely to exhibit a high propensity for interaction, to be used when scoring the users and developing the mapping 109 of content features to users. The propensity metric may be a quantity, such as a numerical output of a the propensity model 108, such that an identifier of a user in a database of user information may be associated with a number (e.g., "N") of propensity metrics corresponding to content tags 220.

In some embodiments, the supervised learning subsystem 153 may implement hyperparametric tuning, in addition to supervised learning, to optimize the propensity model 108. For example, one or more terms of the objective function 265 and/or the propensity model 108 may be tuned by varying parameters that are not learned, such as scalar weighting factors.

Figure 3:
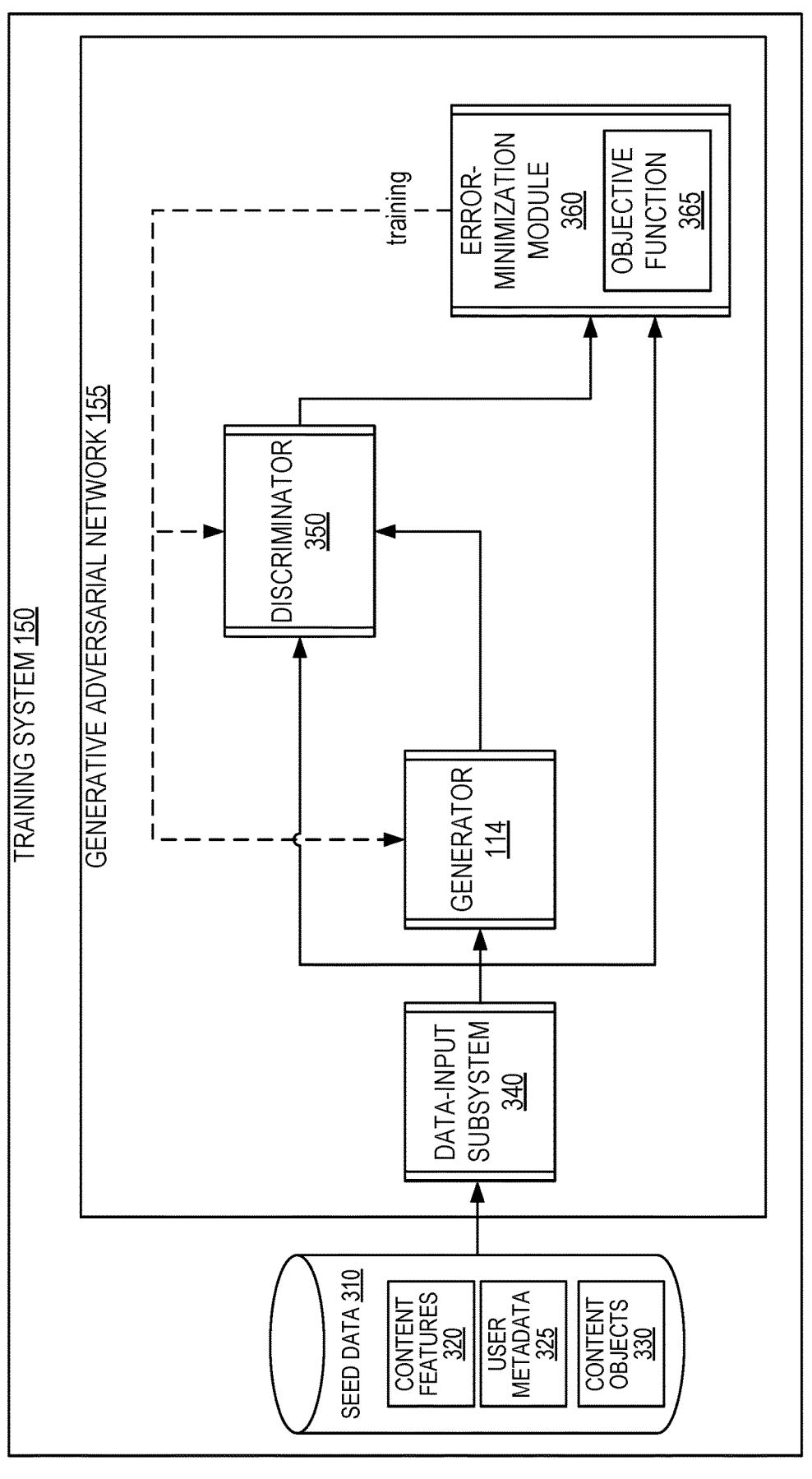
FIG. 3 is a diagram of a training system for training the propensity model, according to certain embodiments described herein.

FIG. 3 is a diagram of the training system 150 configured to train the generator neural network 114 of the content system 100 through the use of a generative adversarial network 155, according to certain embodiments described herein. More specifically, in some embodiments, the generator neural network 114 acts as a generator of the GAN 155, and the training system 150 trains the generator neural network 114 jointly with a discriminator neural network 350 in the GAN 155. An error-minimization module 360 in the GAN 155 may provide one or more training signals back to the generator neural network 114 and the discriminator neural network 350 to train the generator neural network 114 and the discriminator neural network 350, more specifically, using backpropagation to train the generator neural network 114. A data-input subsystem 340 of the training system 150 may provide inputs, such as input based on seed data 310, to the generator neural network 114, the discriminator neural network 350, and the error-minimization module 360 to enable the generator neural network 114, the discriminator neural network 350, and the error-minimization module 360 to perform the tasks described herein. After training, the generator neural network 114 may be used as part of a content system 100 such as that shown in FIG. 1.

In some embodiments, the training system 150 is implemented as a computing device or portion thereof, such as a server. The training system 150 may be implemented as a specialized hardware device or as program code, or a combination of both. For instance, the operations described herein as being performed by the training system 150 may be embodied in program code implementing the training system 150, where such program code is executable by one or more processing units. For instance, the generator neural network 114, the discriminator neural network 350, the error-minimization module 360, and other aspects of the GAN 155 may each be implemented as one or more software functions or specialized hardware devices and may operate together to implement the training system 150 as described herein. The generator neural network 114 and the discriminator neural network 350 may each be implemented as a respective machine-learning model, such as a neural network.

As shown in FIG. 3, the training system 150 may include a GAN 155, which includes a generator neural network 114 and a discriminator neural network 350 trained jointly. Specifically, the generator neural network 114 may be trained within the GAN 155 before, or while, being integrated into the content system 100. Specifically, the training system 150 may train the generator neural network 114 to map content features 320 and user metadata 325 to content objects 330, and the training system 150 may train the discriminator neural network 350 to determine whether a content object is meaningful to a user, for example, whether the text it presents is recognizable as a natural language. Further, an error-minimization module 360 updates the generator neural network 114 and the discriminator neural network 350 to minimize errors between expected predictions and actual predictions made in the GAN 155. In some embodiments, as part of the GAN 155, the generator neural network 114 and the discriminator neural network 350 are trained jointly to cause each of the generator neural network 114 and the discriminator neural network 350 to improve as the other improves. As a result, the generator neural network 114 learns to map user metadata 325 to content objects 330 that is useable to communicate with the set of users.

In some embodiments, the generator neural network 114 is a neural network, such as a sequence-to-sequence (seq2seq) neural network model, for determining content objects 330 based on content features 320 and/or user metadata describing characteristics of users. Conventionally, a generator is trained with training data including a set of tuples, each tuple having a set of content features and a corresponding content object. As described herein, however, in some embodiments, the generator neural network 114 is trained as part of the GAN 155. As such, the training utilizes seed data 310 that includes seed tuples, each seed tuple including content features 320 and/or user metadata, and a corresponding content object 330. However, the training also incorporates output from the discriminator neural network 350.

The discriminator neural network 350 may be a binary classifier that maps a tuple to a class; for instance, the discriminator neural network 350 may be implemented as a neural network. The discriminator neural network 350 may receive as input a tuple including content features 320 and a content object 330, and the discriminator neural network 350 may output an indicator of whether the content object 330 is an authentic representation of the feature 320. For instance, the discriminator neural network 350 may output a probability that the content object 330 is authentic (i.e., paired with the content features 320 in the seed data 310), and thus accurate. In some embodiments, to achieve this, the discriminator neural network 350 may be trained jointly with the generator neural network 114 in the GAN 155.

Authenticity, in the context of images and text, describes whether an image output by the generator neural network 114 includes real or recognizable objects. For example, an image may be generated by the generator neural network 114 to include a cat and a shoe, as predicted by image analysis models, except that the image may include the face of a cat and the tail of a cat blending into the profile of a shoe. To avoid such an outcome, the discriminator neural network 350 may be trained to differentiate between content objects that include images of authentic features, as opposed to those that are unrealistic.

The error-minimization module 360 may provide a training signal to train the discriminator neural network 350 and to train the generator neural network 114 by way of backpropagation. For instance, to train the discriminator neural network 350, the error-minimization module 360 may utilize a first objective function 365 to compare the outputs from the discriminator neural network 350, which are indications of whether content objects 330 received are authentic, to an accurate distribution of indications of authenticity of those content objects 330. The error-minimization module 360 may use the result of the first objective function 365 to train the discriminator neural network 350 to make better predictions of authenticity.

To train the generator neural network 114, the error-minimization module 360 may utilize a second objective function 365, which may be the same as the first objective function 365, to compare the outputs from the discriminator neural network 350, indicating predictions of authenticity of content objects 330 output of the generator neural network 114, to a selected distribution (i.e., a desired distribution) of indications of authenticity of those content objects 330. That selected distribution may be a distribution indicating that all content objects 330 output by the generator neural network 114 are authentic. This is because, in some embodiments, the training system 150 seeks to provide a generator neural network 114 whose outputs are always deemed authentic. One of skill in the art will understand how to construct such objective functions 365.

Figure 4:
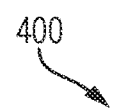
FIG. 4 is a diagram of a method of modifying a content object using a generator neural network model as part of an integration subsystem of the content system, according to certain embodiments described herein.

FIG. 4 is a diagram of a method of modifying a content object using a generator neural network 114 as part of an integration subsystem 110 of the content system 100, according to certain embodiments described herein. Specifically, the content system 100 may perform this method 400 or similar where the integration subsystem 110 has been configured to modify the output of the propensity subsystem 107, and the generator neural network 114 of the integration subsystem 110 has been trained to modify content objects, as described in reference to FIG. 3. Thus, this method 400 or similar may be performed once per iteration according to some embodiments.

The method 400 depicted in FIG. 4, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 400 is intended to be illustrative and non-limiting. Although FIG. 4 depicts various activities occurring in a particular sequence or order, this is not intended to be limiting. In certain embodiments, for instance, the activities may be performed in a different order, or one or more activities of the method 400 may be performed in parallel. In certain embodiments, the method 400 may be performed by the integration subsystem 110 of the content system 100.

At block 405, the integration subsystem 110 obtains seed content and a subset of users. The seed content may be or include the content object provided as part of content input 104, which has been processed by the feature prediction subsystem 106 and the propensity subsystem 107. Obtaining may describe receiving data as part of internal data communication between subsystems of the content system 100 and/or accessing data storage systems in communication with the content system 100. The subset of users, in turn, may describe the set of users selected by the propensity subsystem 107 from a larger set of users, using the content-user mapping 109.

At block 410, the integration subsystem 110 evaluates an integration function to determine whether the subset of users or the seed content satisfy the performance metric for the content object. The integration function may be implemented in various software, such as a rules-based model or an object model, as part of the performance metric subsystem 112 of FIG. 1. The integration function may compare the output of the propensity subsystem 107 with the performance metric. The output of the integration function may be or include a measure of improvement available for the set of users, the content object, or both.

As an illustrative example, for an polling place announcement that is intended to reach first-time voters, a performance metric may include a minimum proportion of users that have registered to vote in the current year. The integration function may, therefore, compare the set of users by identifying the proportion of users of the set of users that have registered to vote in the current year, compare the proportion to the performance metric, and determine a margin of improvement available. For example, where the performance metric describes a proportion of 80% new voters, but the set of users contains 60% new voters, the improvement available may be measured as a proportion (e.g., 20%), as a number of users to add to the subset of users, as a measure of efficacy of the content object, or as a marginal increase in efficacy predicted after adding more new voters to the set of users. Additionally and/or alternatively, the performance metric may describe an average score of the subset of users, as an estimation of the efficacy of the content object when paired to the subset of users. For example, where the subset of users is selected from the top "N" users by score, the average score may vary, based on the composition of the set of users. As such, a performance metric that specifies an average score may trigger the integration subsystem 110 to generate new content objects or to reselect the subset of users.

At decision block 415, the integration subsystem 110 may implement one or more operations to generate a new content object, select a new set of users or a subset of users, or both, based on the output of the integration function and the performance metric, for example, when the output of the integration function satisfies a threshold value, such as a predicted marginal increase in efficacy larger than a predetermined threshold value. By contrast, when the output of the integration function does not satisfy the threshold value, which may indicate that the content object and the set of users may be maintained, the integration subsystem may proceed to block 420 of method 400. At block 420, the integration subsystem 110 outputs the content object and the set of users, as described in more detail in reference to FIG. 1.

In some embodiments, the integration subsystem 110 implements one or more additional techniques when deciding whether improvement is available over the output of the propensity subsystem 107. For example, the integration subsystem 110 may implement computational resource management protocols at decision block 415. Computational resource management describes techniques whereby the resource demand of the generator and modification operations are estimated and compared to a resource allocation for the content object. In this way, the integration subsystem may decide to terminate method 400 at decision block 415, even where the output of block 410 indicates a significant margin of improvement, when modification operations would exceed the computational resources allocated for the tasks. Correspondingly, where computational resources remain from an allocation, the integration subsystem 110 may initiate modification operations, for example, when the output of the integration function approaches the threshold value but does not satisfies it (e.g., a "close case").

Block 425 and block 430 are presented in a particular order, but it is to be understood that the operations represented by each block may be executed in a different order or in para At block 420, the integration subsystem 110 modifies the set of users selected by the propensity subsystem 107, corresponding to the improvement indicated by the output of the performance metric subsystem 112. In the example described above for young voters, the integration subsystem 110 may search a database of user metadata to identify a number of users for which the registration year is the current year, and may include them in a second set of users that includes the initial set of users outputted by the propensity subsystem 107. Because the newly added users may be characterized by different user characteristics than the initial set, other than simply the registration year (e.g., geographic location, preferred device, etc.), the integration system 110 may initialize the content generator subsystem 114 to modify the content object itself, to improve the mapping of the features of the content object to the characteristics of the second set of users. In an illustrative example, adding the new users may shift the distribution of geographic locations of the set of users, and may reduce the probability that an image of a particular landmark will be effective at eliciting user interaction with the content object.

As such, at block 430, the integration subsystem 110 generates the new content object by processing at least part of the content object using the generator neural network 114 to add and/or remove features, as an approach to improving the propensity of the second set of users to interact with the content object. As described in more detail in reference to FIG. 1 and FIG. 3, the content generator subsystem 114 may be configured to add or remove images and/or text of a content object in a way that outputs authentic content objects. In an illustrative example, for a content object generated by a contact tracing application, an input to the generator neural network 114 may include an image of a doctor and text, such as "you may have been exposed, please click this link." Based on the output of the performance metric subsystem 112, however, the generator neural network 114 may modify the content object. For example, the generator neural network 114 may generate a new content object without the image of the doctor, and with a seal of a public health agency from a jurisdiction corresponding to the geographic location of a plurality of users in the set of users. Additionally or alternatively, the generator neural network 114 may replace "click this link" with instructions to contact the public health agency listed. These are merely exemplary modifications, which could address a shift in characteristics of the set of users to include "security conscious" that could reduce the efficacy of a content object for contact tracing that is not perceived to be provided by a recognized public health agency. In terms of propensity metric, the shift could be reflected in an increase in the average score for the users in the second set of users for the tag corresponding to "security conscious."

As part of modifying the content object, the integration subsystem 110 may iterate other subsystems of the content system 100. For example, the integration system 110 may call the feature prediction subsystem 106 to confirm, using a content-tagging machine-learning model, that the modified content object includes the added features and does not include the subtracted features. In this way, the integration subsystem may implement additional verification protocols on the generator neural network 114, in addition to the GAN training described in reference to FIG. 3. Similarly, the integration may call the propensity subsystem 107 to determine a new score for each user in the set of users based on added features. The new scores may be used, for example, to select a new subset of users at block 425, where the method 400 includes block 425 subsequent to block 430.

In some embodiments, the integration subsystem 110 may modify the content object without modifying the set of users. For example, the output of the performance metric subsystem 112 may indicate that the content object can be improved with respect to efficacy. In this way, the content generator subsystem 114 may generate a new content object as described above.

At block 435, the integration subsystem 110 may undertake one or more iterations of the operations of block 410, block 415, block 425, and/or block 430. For example, the integration subsystem 110 may evaluate the modified content object and/or the second set of users against the performance metric. In this way, progress toward satisfying the performance metric for either the set of users, the content object, or both, can be estimated, and an output generated that can be used to decide if additional iterations of the performance metric subsystem 112 and/or the content generator subsystem 114 would further improve the content object or the subset of users.

At decision block 440, the integration subsystem 110 determines whether an improvement is available, and/or resources predicted to be used in iterations of the subsystems are available in a resource allocation. Where the output of decision block 440 is true, the integration subsystem 110 may call the content generator subsystem 114, the performance metric subsystem 112, or both, as described above. Where the output of decision block 440 is false, at block 445, the integration subsystem outputs the modified content object and the modified set of users, as appropriate for the operations implemented during the method 400.

Figure 5:
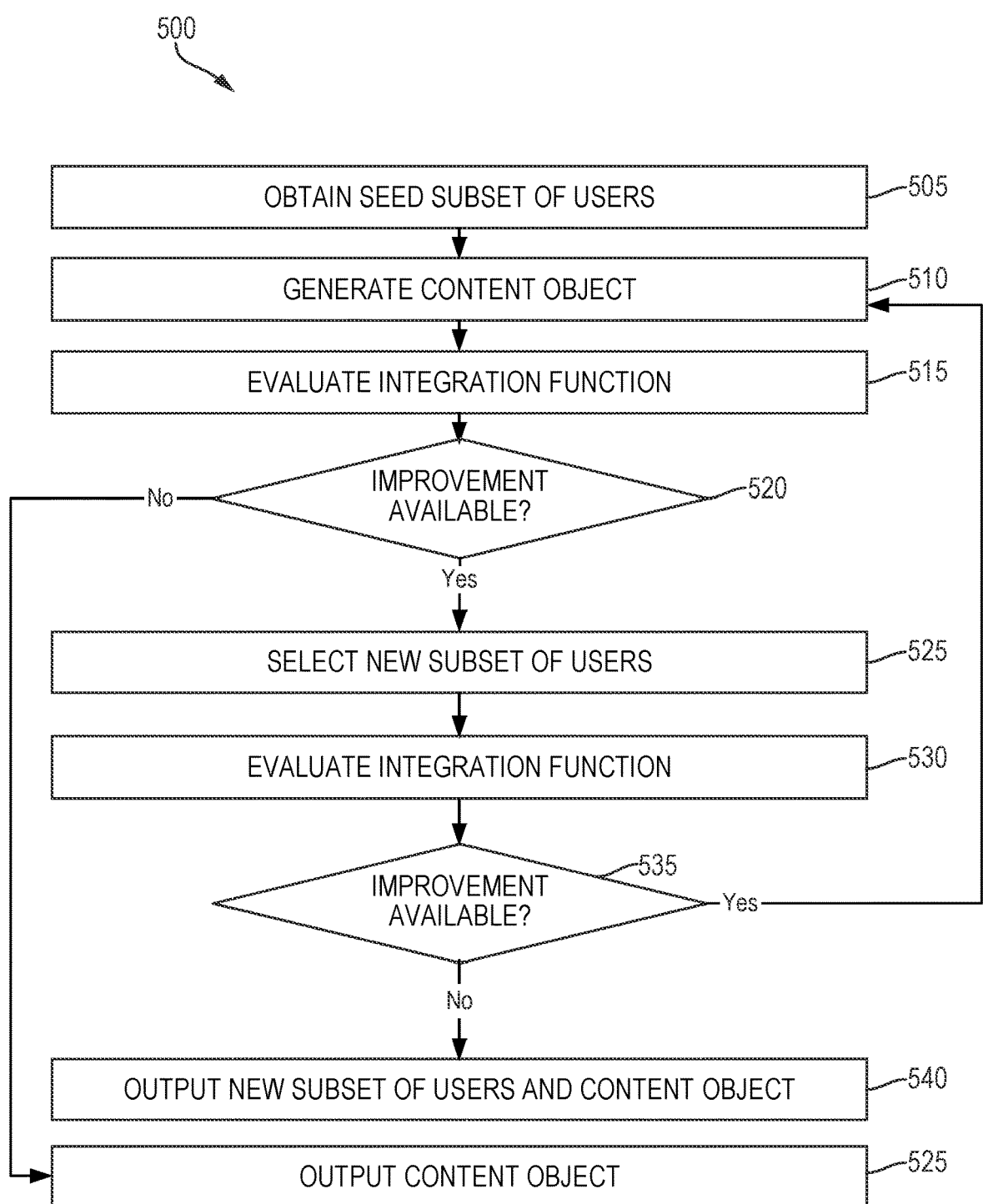
FIG. 5 is a diagram of a method of generating a content object from a seed set of users using a generator neural network model as part of the integration subsystem, according to certain embodiments described herein.

FIG. 5 is a diagram of a method of generating a content object from a seed set of users using a generator as part of the integration subsystem, according to certain embodiments described herein. Specifically, the content system 100 may perform this method 500 or similar where the generator neural network 114 has been trained to generate new content objects from seed sets of users, accessed and/or received as part of the content input 104. Thus, this method 500 or similar may be performed to predict a content object that is likely to elicit a given response level from a given set of users.

The method 500 depicted in FIG. 5, as well as other methods described herein, may be implemented in software (e.g., as code, instructions, or programs) executed by one or more processing units (e.g., processors or processor cores), in hardware, or in combinations thereof. The software may be stored on a non-transitory storage medium, such as on a memory device. This method 500 is intended to be illustrative and non-limiting. Although FIG. 5 depicts various activities occurring in a particular sequence or order, this is not intended to be limiting. In certain embodiments, for instance, the activities may be performed in a different order, or one or more activities of the method 500 may be performed in parallel. In certain embodiments, the method 500 may be performed by the integration subsystem 110 of the content system 100.

The method 500 may be implemented as an approach to generating a content object directly by the content generator subsystem 114, rather than modifying a content object received from a user of the content system 100. For example, a user may specific a seed set of users and a performance metric for a content object as part of the content input 104, without providing a content object. In this way, the content system 100 may call one or more subsystems to predict features of a content object that would satisfy the performance metric, and implement the operations described in reference to FIGS. 1-2 to generate a content object, modify the content object, or modify the seed set of users, in one or more iterations.

For example, at block 505, the integration subsystem 110 obtains the seed subset of users. In addition, the integration subsystem 110 may obtain a set of features corresponding to the seed set of users, according to the performance metric. The features may be provided by the propensity subsystem 107 and/or may be predicted by an internal mapping determined by the generator neural network 114 as part of GAN training.

At block 510, the content generator subsystem 114 may generate a content object that includes one or more of the features mapped to the seed set of users. As opposed to the operations of the method 400 of FIG. 4, generating the content object describes generating a content object based on an input of features without inputting an existing content object. For example, the generator neural network 114 may be trained as part of a GAN to output a content object including an image that, when processed by the feature prediction subsystem 106 using a content-tagging machine-learning model, will reproduce the features that map to the seed subset of users. For example, the seed subset of users may have a high propensity to interact with content tags including "student," "travel," "reading," as judged by relatively high average scores for each of the content tags. As such, the generator neural network 114 may generate a content object including an image of a famous university library located in a tourist destination.

As in the method 400, the method 500 may include operations to evaluate the improvements available and to modify the content object or the set of users. For example, at block 515, the integration subsystem 110 may evaluate the integration function. At decision block 520, the integration system may decide whether to select a new subset of users, for example, by comparing the output of the integration function to a threshold value. Where the output of the decision block 520 is false, the integration subsystem 110 may output the content object generated at block 510. Where the output of the decision block 520 is true, the integration subsystem 110 may select a new subset of users, generate a new content object, or both.

At block 525, the integration subsystem 110 selects a new subset of users to better satisfy the performance metric. Block 525 may be helpful to improve the efficacy of the content object, for example, where a database of user metadata may be updated relative to the state of the seed set of users. As such, the seed set of users may be modified to add and/or remove users, providing a modified set of users. Similar evaluation and iteration operations may be implemented at block 530 and decision block 535, such that the set of users and/or the content object may be iteratively improved, in line with the a computation resource allocation if one is provided. Where the output of the decision block 535 is false, the integration subsystem 110 may output the modified content object and the subset of users at block 540. Where the output of the decision block 535 is true, the integration subsystem 110 may modify the seed set of users, the content object, or both.

Figure 6:
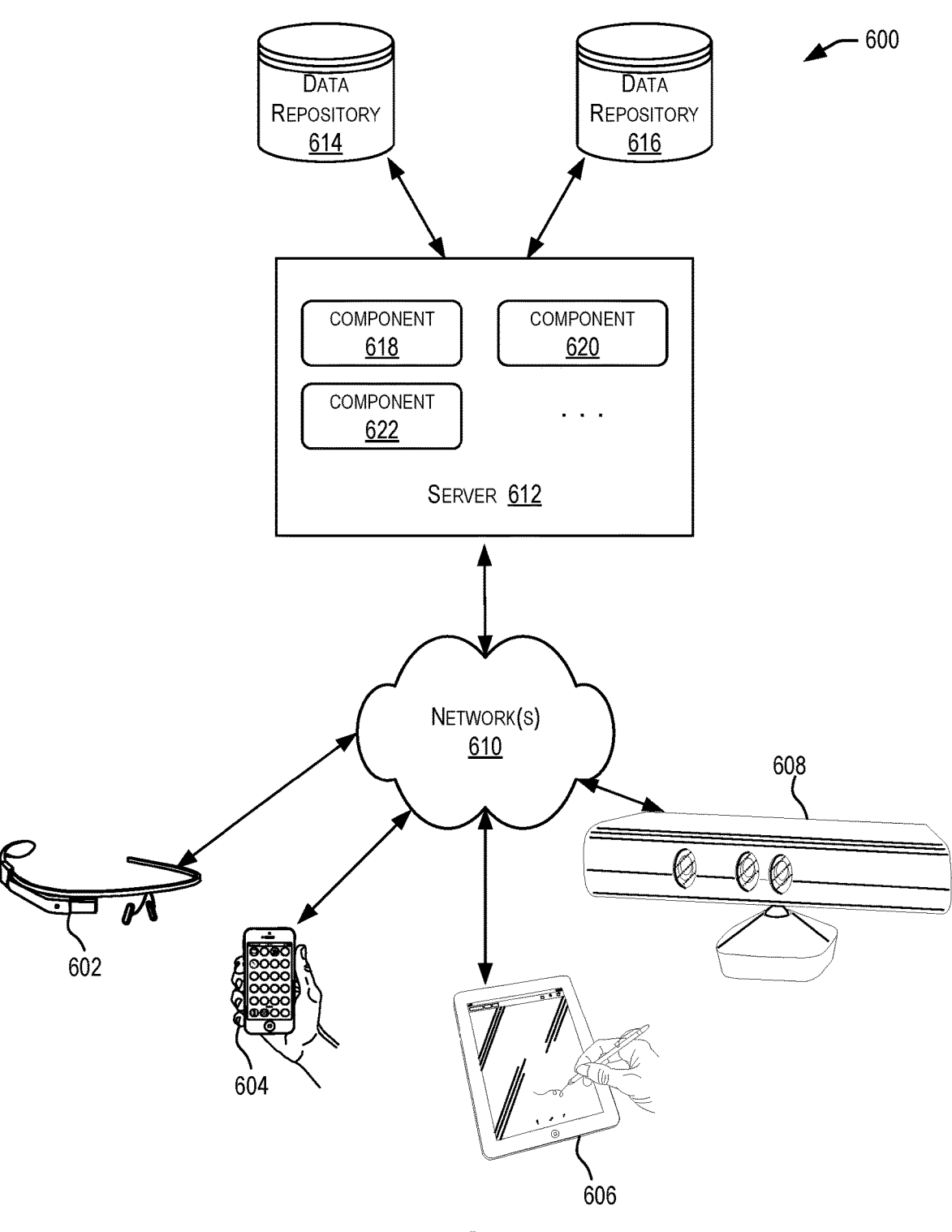
FIG. 6 is a diagram of a distributed system for implementing certain embodiments described herein.

FIG. 6 is a diagram of a distributed system 600 for implementing certain embodiments. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable the use of a content system 100 as described herein. For instance, server 612 may execute some or all aspects of the training system 150 or some or all aspects of the content system 100.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components. More specifically, for instance, each of client computing devices 602, 604, 606, and/or 608 may be an embedded device configured to execute the content system 100 and, further, configured to communicate with server 612.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to interact with aspects of the content system 100 provided by server 612 in accordance with the teachings of this disclosure. A client device may provide an interface (e.g., a speech interface) that enables a user of the client device to interact with the client device. The client device may also output information to the user via this interface. Although FIG. 6 depicts only four client computing devices, any number of client computing devices may be supported.

The client devices may include various types of computing systems such as PA devices, portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of data repositories 614, 616 may be used to store data. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
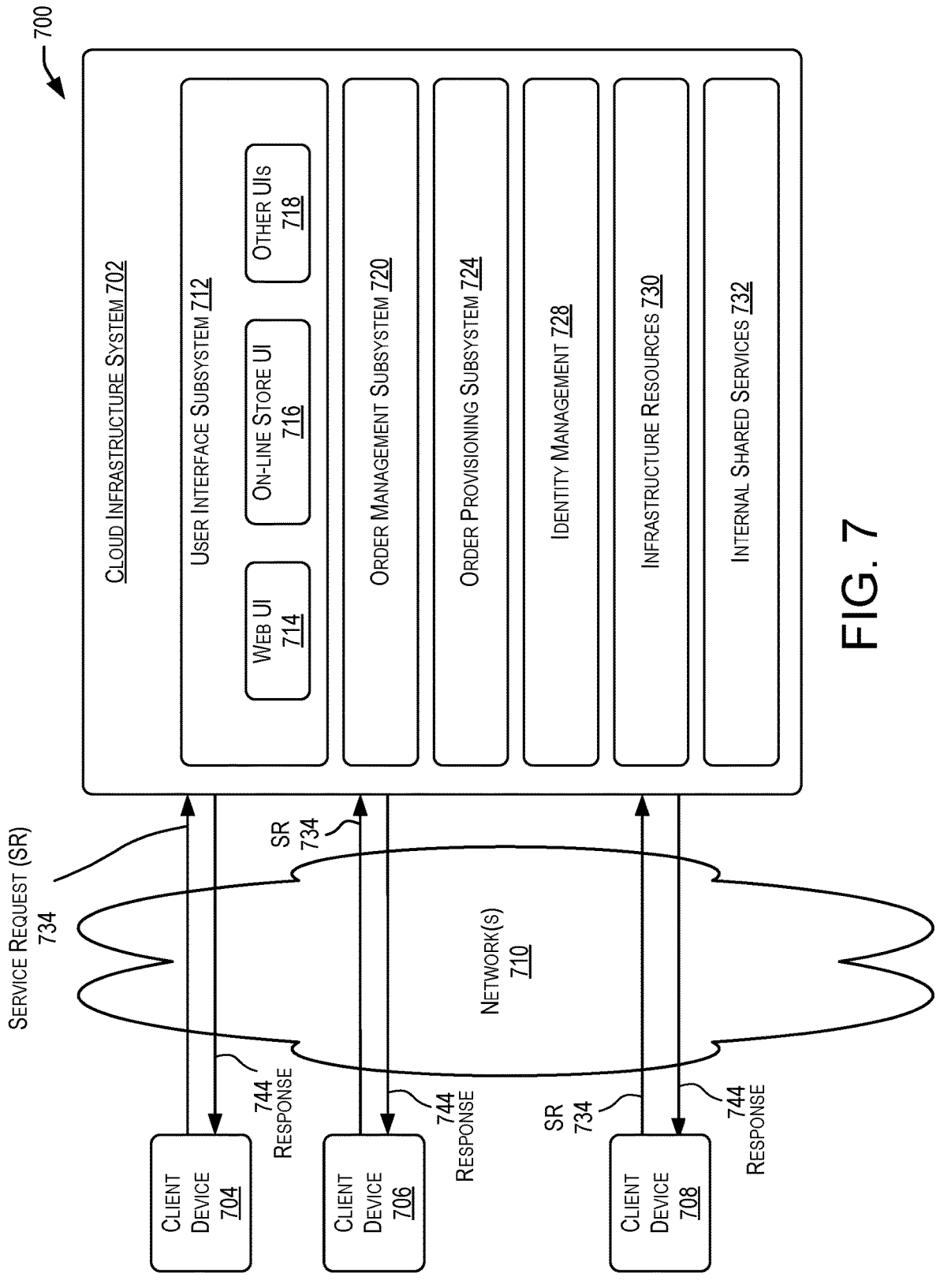
FIG. 7 is a block diagram of a cloud-based system environment in which training generator neural network model in a generative adversarial network may be offered at least in part as a cloud service, according to certain embodiments described herein.

In certain embodiments, all or a portion of the content system 100, as described herein, may be offered as services via a cloud environment. FIG. 7 is a block diagram of a cloud-based system environment in which training the generator neural network 114, as described herein, may be offered at least in part as a cloud service, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between client computing devices 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, a customer may subscribe to information services or other services provided by the content system 100 in conversational form. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as client computing devices 602, 604, 606, and 608 depicted in FIG. 6) and may be capable of operating one or more client applications. A user may use a client computing device to interact with cloud infrastructure system 702, such as to request a service provided by cloud infrastructure system 702. An attacker may use a client device to send malicious requests.

In some embodiments, the processing performed by cloud infrastructure system 702 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the infrastructure resources 730 may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and that facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke an order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
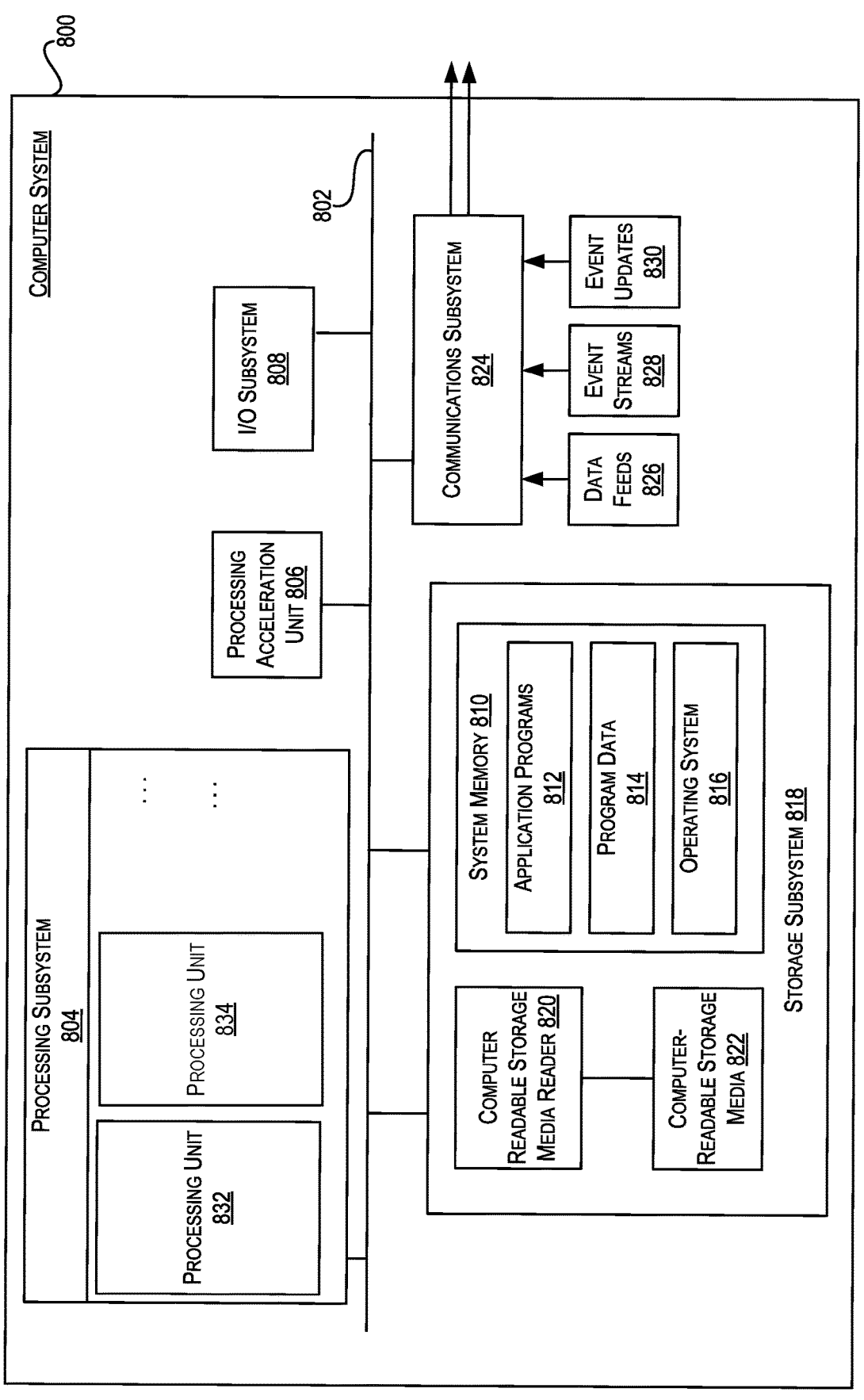
FIG. 8 is a block diagram of an example computer system that may be used to implement certain embodiments described herein.

FIG. 8 is a block diagram of an example computer system 800 that may be used to implement certain embodiments. For example, in some embodiments, computer system 800 may be used to implement any of systems, subsystems, and components described herein. For example, multiple host machines may provide and implement processes of a content system 100 as described herein. Computer systems such as computer system 800 may be used as host machines. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer-readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

In certain embodiments, software instructions or code implementing the content system 100, as described herein, may be executed in system memory 810.

Computer-readable storage media 822 may store programming and data constructs that provide the functionality of some embodiments. Computer-readable storage media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims. The modifications and/or variations include any relevant combination of the disclosed features.

In accordance with some embodiments, the disclosed features are summarized as follows:

Example 1 is a computer-implemented method comprising: accessing, for each user of a set of users, a set of user metadata that corresponds to characteristics of the user; predicting, for each user of the set of users and for each content tag of one or more content tags, a propensity metric indicating an extent to which the user has propensity for interacting with content objects associated with the content tag, wherein the propensity metrics for the set of users are generated by processing the set of user metadata using a machine-learning propensity model; accessing a particular content object that comprises image data or text data or both; and generating, using a content-tagging machine-learning model, a set of features characterizing the content object; determining, for each user in the set of users, a score that predicts a propensity of the user interacting with the particular content object, the score being based on at least some of the propensity metrics associated with the user and at least some of the set of features; selecting a subset of users of the set of users based on the scores determined for the set of users; and facilitating output of the particular content object to each of the subset of users.

Example 2 is the method of any previous or subsequent aspect, further comprising: generating a new content object by processing at least part of the content object using a generator neural network configured to generate content objects with which users within a particular population of users will interact; generating, using the content-tagging machine-learning model, a new set of features characterizing the new content object; determining, for each user in the set of users, a new score that predicts a propensity of the user interacting with the new content object, the new score being based on at least some of the propensity metrics associated with the user and at least some of the new set of features; selecting a new subset of the set of users based on the new scores; and facilitating output of the new content object to each of the new subset of users.

Example 3 is the method of any previous or subsequent aspect, wherein the particular population is the subset of users.

Example 4 is the method of any previous or subsequent aspect, further comprising: accessing seed data comprising seed tuples, each seed tuple of the seed data comprising a respective content object and a respective feature corresponding to the respective content object; and training the generator neural network and a discriminator neural network in a generative adversarial network (GAN), wherein, in the GAN, the generator neural network learns to generate content objects comprising one or more features of the feature set and the discriminator learns to recognize generated content objects that are authentic.

Example 5 is the method of any previous or subsequent aspect, wherein the generator neural network is a sequence-to-sequence neural network, and the discriminator neural network is a binary classifier.

Example 6 is the method of any previous or subsequent aspect, wherein processing the set of user metadata comprises: identifying a subset of user characteristics of the user metadata for each user of the set of users, based on a relevance to the particular content object.

Example 7 is the method of any previous or subsequent aspect, wherein the machine-learning propensity model comprises a multinomial logistic regression model.

Example 8 is the method of any previous or subsequent aspect, wherein the method further comprises: training the machine-learning propensity model, wherein the training comprises: accessing a training set comprising a plurality of content objects labeled with tags and user metadata paired to the tags and defining a ground truth for training the machine-learning propensity model; inputting the user metadata to the machine-learning propensity model; predicting, as an output of the machine-learning propensity model, a subset of tags of the tags; determining a value of an objective function, wherein the objective function comprises an estimate of an error between the output of the propensity model and the ground truth; and determining a set of coefficients corresponding to the tags and metadata, at least in part by minimizing the objective function.

Example 9 is a content system comprising: one or more data processors; and a non-transitory computer readable storage medium containing instructions which, when executed on the one or more data processors, cause the one or more data processors to perform a set of actions including: accessing, for each user of a set of users, a set of user metadata that corresponds to characteristics of the user; predicting, for each user of the set of users and for each content tag of one or more content tags, a propensity metric indicating an extent to which the user has propensity for interacting with content objects associated with the content tag, wherein the propensity metrics for the set of users are generated by processing the set of user metadata using a machine-learning propensity model; accessing, for a seed subset of users of the set of users, a set of user metadata for each user of the seed subset of users that corresponds to characteristics of the user; and determining, from the propensity metric for each user in the subset of users, a set of features for a content object; generating, using a generator neural network model, the content object that comprises images, text, or both, corresponding to the set of features; and facilitating output of the content object to each of the seed subset of users.

Example 10 is the system of any previous or subsequent aspect, wherein the instructions, when executed on the one or more data processors, further cause the one or more data processors to perform actions comprising: determining, for each user in the seed subset of users, a score that predicts a propensity of the user interacting with the content object, the score being based on at least some of the propensity metrics associated with the user and at least some of the set of features; selecting a new subset of the set of users based on the scores; and facilitating output of the content object to each of the new subset of users.

Example 11 is the system of any previous or subsequent aspect, wherein the instructions, when executed on the one or more data processors, further cause the one or more data processors to perform actions comprising: accessing seed data comprising seed tuples, each seed tuple of the seed data comprising a respective content object and a respective feature corresponding to the respective content object; and training the generator neural network and a discriminator neural network in a generative adversarial network (GAN), wherein, in the GAN, the generator neural network learns to generate content objects comprising one or more features of the feature set and the discriminator learns to recognize generated content objects that are authentic.

Example 12 is the system of any previous or subsequent aspect, wherein the generator neural network is a sequence-to-sequence neural network, and the discriminator neural network is a binary classifier.

Example 13 is the system of any previous or subsequent aspect, wherein processing the set of user metadata comprises: identifying a subset of user characteristics of the user metadata for each user of the set of users, based on a relevance to the content object.

Example 14 is the system of any previous or subsequent aspect, wherein the machine-learning propensity model comprises a multinomial logistic regression model.

Example 15 is a non-transitory computer-readable memory storing instructions that, when executed by one or more data processors of a computer system, cause the one or more data processors to perform a set of actions including: accessing, for each user of a set of users, a set of user metadata that corresponds to characteristics of the user; predicting, for each user of the set of users and for each content tag of one or more content tags, a propensity metric indicating an extent to which the user has propensity for interacting with content objects associated with the content tag, wherein the propensity metrics for the set of users are generated by processing the set of user metadata using a machine-learning propensity model; accessing a particular content object that comprises image data or text data or both; and generating, using a content-tagging machine-learning model, a set of features characterizing the content object; determining, for each user in the set of users, a score that predicts a propensity of the user interacting with the particular content object, the score being based on at least some of the propensity metrics associated with the user and at least some of the set of features; selecting a subset of users of the set of users based on the scores determined for the set of users; and facilitating output of the particular content object to each of the subset of users.

Example 16 is the computer-readable memory of any previous or subsequent aspect, wherein the instructions, when executed on the one or more data processors, further cause the one or more data processors to perform actions comprising: generating a new content object by processing at least part of the content object using a generator neural network configured to generate content objects with which users within a particular population of users will interact; generating, using the content-tagging machine-learning model, a new set of features characterizing the new content object; determining, for each user in the set of users, a new score that predicts a propensity of the user interacting with the new content object, the new score being based on at least some of the propensity metrics associated with the user and at least some of the new set of features; selecting a new subset of the set of users based on the new scores; and facilitating output of the new content object to each of the new subset of users.

Example 17 is the computer-readable memory of any previous or subsequent aspect, wherein the particular population is the subset of users.

Example 18 is the computer-readable memory of any previous or subsequent aspect, further comprising: accessing seed data comprising seed tuples, each seed tuple of the seed data comprising a respective content object and a respective feature corresponding to the respective content object; and training the generator neural network and a discriminator neural network in a generative adversarial network (GAN), wherein, in the GAN, the generator neural network learns to generate content objects comprising one or more features of the feature set and the discriminator learns to recognize generated content objects that are authentic.

Example 19 is the computer-readable memory of any previous or subsequent aspect, wherein the generator neural network is a sequence-to-sequence neural network, and the discriminator neural network is a binary classifier.

Example 20 is the computer-readable memory of any previous or subsequent aspect, wherein processing the set of user metadata comprises: identifying a subset of user characteristics of the user metadata for each user of the set of users, based on a relevance to the particular content object.

What is claimed is:

1. A computer-implemented method comprising:

accessing, for each user of a set of users, a user metadata that corresponds to characteristics of the user;

predicting, for each user of the set of users and for each content tag of one or more content tags, a propensity metric, wherein:

the propensity metric for each user of the set of users are generated by processing the user metadata using a machine-learning propensity model that is configured as a non-binary classifier trained on a training set, the training set comprises a plurality of content objects labeled with tags, a plurality of user metadata paired to the tags and defining a ground truth for training the machine-learning propensity model that is configured to map a user metadata of the plurality of user metadata to the one or more content tags, and the propensity metric indicates a probability of each of the user of the set of users to interact with the plurality of content objects associated with one or more content tags;

accessing a particular content object of the plurality of content objects that comprises image data or text data or both;

generating, using a content-tagging machine-learning model, a first set of qualitative features characterizing elements of the particular content object, wherein the content-tagging machine-learning model is a classifier model;

determining, for each user in the set of users, a score that predicts a propensity of the user interacting with the particular content object, the score being based at least on the propensity metric generated by the machine-learning propensity model associated with the user and the first set of qualitative features generated by the content-tagging machine learning model;

selecting a first subset of users of the set of users based on the scores determined for the set of users;

generating, when a predicted level of interaction of the first subset of users with the particular content object is below a threshold level, a new content object having a second set of qualitative features by processing at least part of the content object by adding, editing or removing visual elements and/or text corresponding to the first set of qualitative features using a generator neural network, the new content object including image data, wherein:

the generator neural network is trained to reference the machine-learning propensity model in accordance with mapping generated by the machine-learning propensity model, and the generator neural network is configured to generate content objects comprising one or more features of the set of qualitative features with which users are predicted to interact based on one or more results generated by the machine-learning propensity model;

determining, by a discriminator neural network, authenticity of the second set of qualitative features associated with the image data, wherein the authenticity indicates whether the second set of qualitative features corresponds to a recognizable or realistic content object in the image data;

determining, for each user in the set of users, a new score that predicts a propensity of the user to interact with the new content object, the new score being based at least on the propensity metric associated with the user and the second set of qualitative features;

selecting a second subset of the set of users based on the new score; and facilitating output of the new content object to each of the second subset of users.

2. The method of claim 1, further comprising:

accessing seed data comprising seed tuples, each seed tuple of the seed data comprising a respective content object and a respective feature corresponding to the respective content object; and training the generator neural network and a discriminator neural network in a generative adversarial network (GAN), wherein, in the GAN, the generator neural network learns to generate content objects comprising one or more features of a feature set and the discriminator neural network learns to recognize generated content objects that are authentic.

3. The method of claim 2, wherein the generator neural network is a sequence-to-sequence neural network, and the discriminator neural network is a binary classifier.

4. The method of claim 3, wherein the method further comprises: training the machine-learning propensity model, wherein the training comprises:

accessing the training set;

inputting a user metadata of the plurality of user metadata to the machine-learning propensity model;

predicting, as an output of the machine-learning propensity model, a subset of tags of the tags;

determining a value of an objective function, wherein the objective function comprises an estimate of an error between the output of the machine-learning propensity model and the ground truth; and determining a set of coefficients corresponding to the tags and metadata, at least in part by minimizing the objective function.

5. The method of claim 1, wherein processing the user metadata comprises:

identifying a subset of user characteristics using the user metadata for each user of the set of users, based on a relevance to the particular content object.

6. The method of claim 1, wherein the machine-learning propensity model comprises a multinomial logistic regression model.

7. A content system comprising:

one or more data processors; and a non-transitory computer readable storage medium containing instructions which, when executed on the one or more data processors, cause the one or more data processors to perform a set of actions including:

accessing, for each user of a set of users, a user metadata that corresponds to characteristics of the user;

predicting, for each user of the set of users and for each content tag of one or more content tags, a propensity metric, wherein:

the propensity metric for each user of the set of users are generated by processing the user metadata using a machine-learning propensity model that is configured as a non-binary classifier trained on a training set, the training set comprises a plurality of content objects labeled with tags, a plurality of user metadata paired to the tags and defining a ground truth for training the machine-learning propensity model that is configured to map a user metadata of the plurality of user metadata to the one or more content tags, and the propensity metric indicates a probability of each of the user of the set of users to interact with the plurality of content objects associated with one or more content tags;

accessing a particular content object of the plurality of content objects that comprises image data or text data or both;

generating, using a content-tagging machine-learning model, a first set of qualitative features characterizing elements of the particular content object, wherein the content-tagging machine-learning model is a classifier model;

determining, for each user in the set of users, a score that predicts a propensity of the user interacting with the particular content object, the score being based at least on the propensity metric generated by the machine-learning propensity model associated with the user and the first set of qualitative features generated by the content-tagging machine learning model;

selecting a first subset of users of the set of users based on the scores determined for the set of users;

generating, when a predicted level of interaction of the first subset of users with the particular content object is below a threshold level, a new content object having a second set of qualitative features by processing at least part of the content object by adding, editing or removing visual elements and/or text corresponding to the first set of qualitative features using a generator neural network, the new content object including image data, wherein:

the generator neural network is trained to reference the machine-learning propensity model in accordance with mapping generated by the machine-learning propensity model, and the generator neural network is configured to generate content objects comprising one or more features of the set of qualitative features with which users are predicted to interact based on one or more results generated by the machine-learning propensity model;

determining, by a discriminator neural network, authenticity of the second set of qualitative features associated with the image data, wherein the authenticity indicates whether the second set of qualitative features corresponds to a recognizable or realistic content object in the image data;

determining, for each user in the set of users, a new score that predicts a propensity of the user to interact with the new content object, the new score being based at least on the propensity metric associated with the user and the second set of qualitative features;

selecting a second subset of the set of users based on the new score; and facilitating output of the new content object to each of the second subset of users.

8. The content system of claim 7, wherein the instructions, when executed on the one or more data processors, further cause the one or more data processors to perform actions comprising:

accessing seed data comprising seed tuples, each seed tuple comprising a respective content object and a respective feature corresponding to the respective object; and training the generator neural network and a discriminator neural network in a generative adversarial network (GAN), wherein, in the GAN, the generator neural network learns to generate content objects comprising one or more features of a feature set and the discriminator neural network learns to recognize generated content objects that are authentic.

9. The content system of claim 8, wherein the generator neural network is a sequence-to-sequence neural network, and the discriminator neural network is a binary classifier.

10. The content system of claim 7, wherein processing the user metadata comprises:

identifying a subset of user characteristics using the user metadata for each user of the set of users, based on a relevance to the content object.

11. The content system of claim 7, wherein the machine-learning propensity model comprises a multinomial logistic regression model.

12. A non-transitory computer-readable memory storing instructions that, when executed by one or more data processors of a computer system, cause the one or more data processors to perform a set of actions including:

accessing, for each user of a set of users, a user metadata that corresponds to characteristics of the user;

predicting, for each user of the set of users and for each content tag of one or more content tags, a propensity metric, wherein:

the propensity metric for each user of the set of users are generated by processing the user metadata using a machine-learning propensity model that is configured as a non-binary classifier trained on a training set, the training set comprises a plurality of content objects labeled with tags, a plurality of user metadata paired to the tags and defining a ground truth for training the machine-learning propensity model that is configured to map a user metadata of the plurality of user metadata to the one or more content tags, and the propensity metric indicates a probability of each of the user of the set of users to interact with the plurality of content objects associated with one or more content tags;

accessing a particular content object of the plurality of content objects that comprises image data or text data or both;

generating, using a content-tagging machine-learning model, a first set of qualitative features characterizing elements of the particular content object, wherein the content-tagging machine-learning model is a classifier model;

determining, for each user in the set of users, a score that predicts a propensity of the user interacting with the particular content object, the score being based at least on the propensity metric generated by the machine-learning propensity model associated with the user and the first set of qualitative features generated by the content-tagging machine learning model;

selecting a first subset of users of the set of users based on the scores determined for the set of users;

generating, when a predicted level of interaction of the first subset of users with the particular content object is below a threshold level, a new content object having a second set of qualitative features by processing at least part of the content object by adding, editing or removing visual elements and/or text corresponding to the first set of qualitative features using a generator neural network, the new content object including image data wherein:

the generator neural network is trained to reference the machine-learning propensity model in accordance with mapping generated by the machine-learning propensity model, and the generator neural network is configured to generate content objects comprising one or more features of the set of qualitative features with which users are predicted to interact based on one or more results generated by the machine-learning propensity model;

determining, by a discriminator neural network, authenticity of the second set of qualitative features associated with the image data, wherein the authenticity indicates whether the second set of qualitative features corresponds to a recognizable or realistic content object in the image data;

determining, for each user in the set of users, a new score that predicts a propensity of the user to interact with the new content object, the new score being based at least on the propensity metric associated with the user and the second set of qualitative features;

selecting a second subset of the set of users based on the new score; and facilitating output of the new content object to each of the second subset of users.

13. The computer-readable memory of claim 12, further comprising:

accessing seed data comprising seed tuples, each seed tuple comprising a respective content object and a respective feature corresponding to the respective object; and training the generator neural network and a discriminator neural network in a generative adversarial network (GAN), wherein, in the GAN, the generator neural network learns to generate content objects comprising one or more features of a feature set and the discriminator neural network learns to recognize generated content objects that are authentic.

14. The computer-readable memory of claim 13, wherein the generator neural network is a sequence-to-sequence neural network, and the discriminator neural network is a binary classifier.

15. The computer-readable memory of claim 12, wherein processing the user metadata comprises:

identifying a subset of user characteristics using the user metadata for each user of the set of users, based on a relevance to the particular content object.

* * * * *